United States Patent [19]

Poitier

[11] Patent Number: 4,466,754
[45] Date of Patent: Aug. 21, 1984

[54] DEVICE FOR MUTUAL ASSEMBLY OF TWO PARTS HAVING TO BE OCCASIONALLY DISASSEMBLED

[75] Inventor: Gérard C. M. Poitier, Gennevilliers, France

[73] Assignee: Societe Anonyme des Usines Chausson, Asnieres, France

[21] Appl. No.: 387,652

[22] Filed: Jun. 11, 1982

[30] Foreign Application Priority Data

Jun. 12, 1981 [FR] France ................................. 81 11605

[51] Int. Cl.³ ............................................... B25G 3/00
[52] U.S. Cl. ........................................ 403/11; 403/286; 403/316
[58] Field of Search ............... 403/286, 315, 318, 316, 403/11, 14

[56] References Cited

U.S. PATENT DOCUMENTS 3,285,637 11/1966 Taussig ................................ 403/345
3,466,799 9/1969 Stilson ............................. 403/338 X

FOREIGN PATENT DOCUMENTS 521961 8/1953 Belgium .............................. 403/286

Primary Examiner—Andrew V. Kundrat
Attorney, Agent, or Firm—Browdy and Neimark

[57] ABSTRACT

Device for mutual assembly of two parts which have to be occasionally disassembled, said two parts being produced from a synthetic material by moulding. There is provided on the outer wall of said parts at least one assembling group comprising a male portion on one of the parts and a female portion on the other part, the female portion defining a member for freeing the male portion and each of the two parts being formed with protrusions or noses for the subsequent engagement of resilient clips should there be a deterioration, even partial, of the assembling group during disassembly.

8 Claims, 4 Drawing Figures

DEVICE FOR MUTUAL ASSEMBLY OF TWO PARTS HAVING TO BE OCCASIONALLY DISASSEMBLED

FIELD OF THE INVENTION

The present invention relates to a new and useful device for the mutual assembly of two parts which have to be mechanically assembled with a view to be possibly disassembled, but this only occasionally.

In particular, the invention applies to parts such as casings containing various components, and more especially casings of air conditioning mechanisms for motor vehicles, casings which comprise one or several electro-fans and one or several heat exchangers as well as mobile flaps.

These casings are placed in position during the initial mounting in the works and it is important that their assembly be carried out extremely rapidly without necessitating any tools and without any particular precautions to be taken by the operator making said assembly.

Thus are known interlocking assemblies which are currently used in the hereabove mentioned technical field.

However, it has appeared that in some cases it could be necessary to draw apart the two parts which had previously been interlockably assembled in order for example to change a damaged motor or heat exchanger.

The interlocking elements hitherto used do not authorize disassembling or, if they do so, provide when they are initially put in place an assembly which is not very reliable and has a reduced mechanical resistance, and are deteriorated to such an extent when they are disassembled that they have also to be changed, thereby increasing the repairing costs.

OBJECT AND SUMMARY OF THE INVENTION

The object of the present invention is to remedy with such a disadvantage.

According to the invention, the device for mutual assembly of two parts which have to be occasionally disassembled, said two parts being produced from a synthetic material by moulding, is characterized in that there is provided on the outer wall of said parts at least one assembling group comprising a male portion on one of the parts and a female portion on the other part, the female portion defining a member for freeing the male portion and each of the two parts being formed with protrusions or noses for the subsequent engagement of resilient clips should there be a deterioration, even partial, of the assembling group during disassembly.

Various other features of the invention will become more apparent from the following detailed description.

BRIEF DESCRIPTION OF THE DRAWINGS

An embodiment of the object of the invention is shown by way of a non limiting example in the appended drawings wherein.

DETAILED DESCRIPTION OF THE INVENTION

Figure 1:
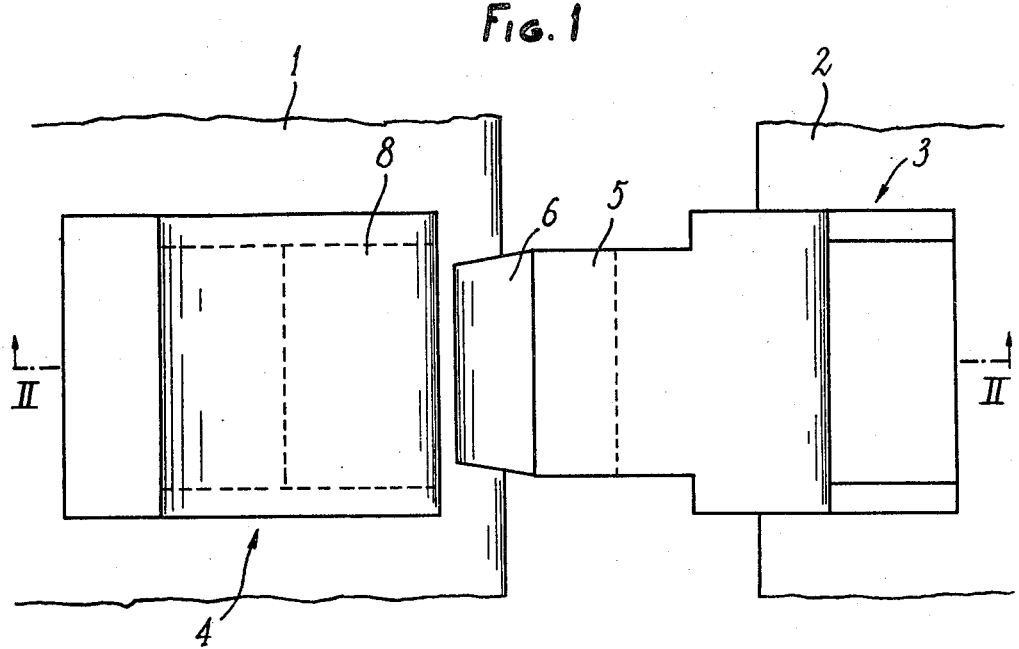
FIG. 1 is an exploded plan view, from above, of the interlocking device of the invention.
Figure 2:
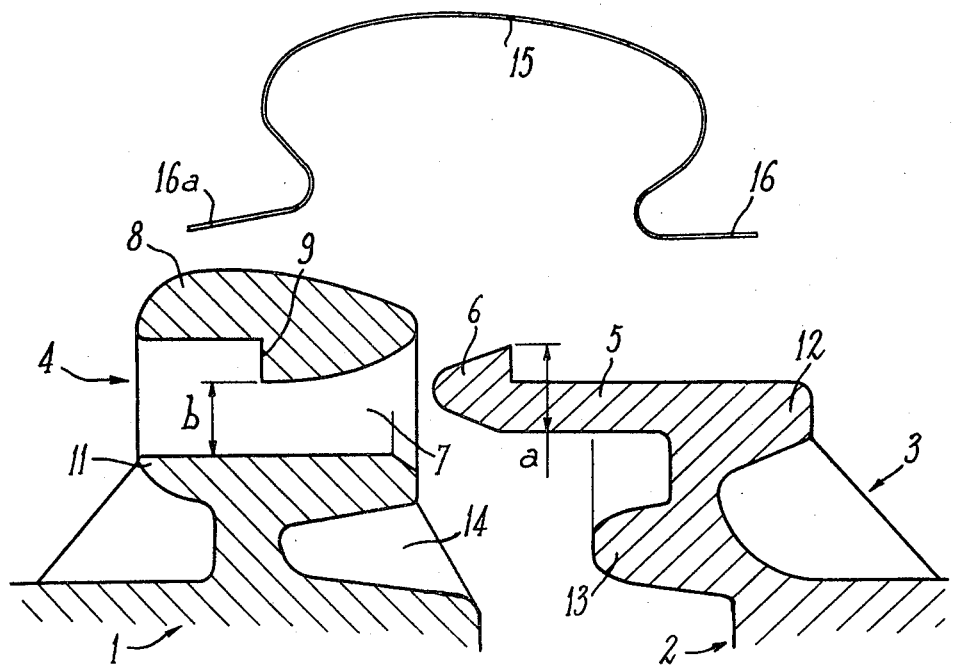
FIG. 2 is an exploded cross-sectional view along line II—II of FIG. 1.

In the drawings, references 1 and 2 designate respectively two parts, for example two parts of an air conditioning casing for motor vehicles, these two parts having to be connected together while authorizing if necessary, their disassembly and their reassembly for example after a repair of components enclosed into said two parts 1, 2. Parts 1 and 2 are produced from a synthetic material, typically by injection, and, according to the invention, assembling groups 3, 4 are integrally moulded at various points on their outer wall.

Each group 3 which is a male group comprises a tongue 5 formed with a hook 6 at its end.

The female groups 4 comprise a channel 7 the top of which is defined by a small bridge 8 forming an edge 9 matching with the hook 6.

Although not necessary, it is advantageous that the small bridge 8 comprises at least one hole.

At the bottom of channel 7 is formed a protrusion or nose 11, and a similar nose 12 is formed on the upper portion of the male assembling group 3. A centering boss 13 and cavity 14 are also advantageously formed in the groups 3 and 4.

As is shown in FIG. 1, it is advantageous that the nose 11 and 12 extend over a portion only of the width of the assembling groups.

Figure 4:
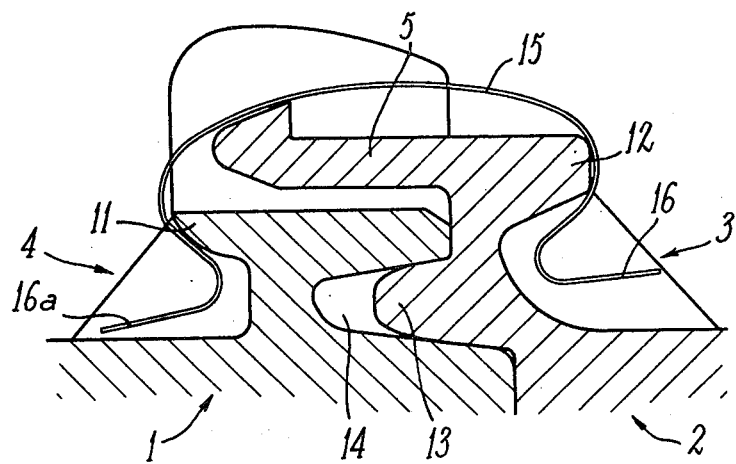
FIG. 4 is a cross-sectional view similar to FIG. 3, the device being mounted according to its final configuration subsequent to a first disassembly.

During initial assembly, the parts 1 and 2 are simply brought near each other so that the tongue 5 extends into the channel 7 until the moment where the hook 6 is interlockably engaged with the edge 9 of the small bridge 8. Dimension a of the drawing is greater than dimension b so that the interlockable engagement is not liable to fail when there is a deformation of the tongue 5; the assembly is made possible due to the resilient deformation of the small bridge 8. In this way, the two parts 1 and 2 are assembled side by side as shown in FIG. 4. If there is a need for dismounting the parts 1 and 2, an attempt could be made to slightly flex the tongue 5 by using a tool introduced into the hole. However, this is possible when there is only a small number of assembling groups for connecting two parts 1 and 2. In the contrary case, this operation is not practical since, as the tongue is being flexed in order to escape from the edge 9, the other tongues remain in engagement, the result being that a disassembly is, if not impossible, at least very lengthy and involves the eventual intervention of several persons.

Therefore, it is frequent, during disassembly, that the operator merely breaks the small bridge 8, this being easily done by using a simple screw-driver. During this operation, the tongue 5 can be broken as well, or not.

When it is desired to reassemble the parts 1 and 2, for example after having changed a component which they contain, they are brought close to each other in the same way as previously and their locking is provided by means of resilient clips 15, having a curved end, which are engaged, on the one hand, on the nose 12 of the male assembling group, and, on the other hand, on the nose 11 of the female assembling group.

It is advantageous that the two ends of the clip form an inclined engagement edge 16, 16a, defining a ramp in order to facilitate its mounting by simply exerting a pressure on its top.

Figure 3:
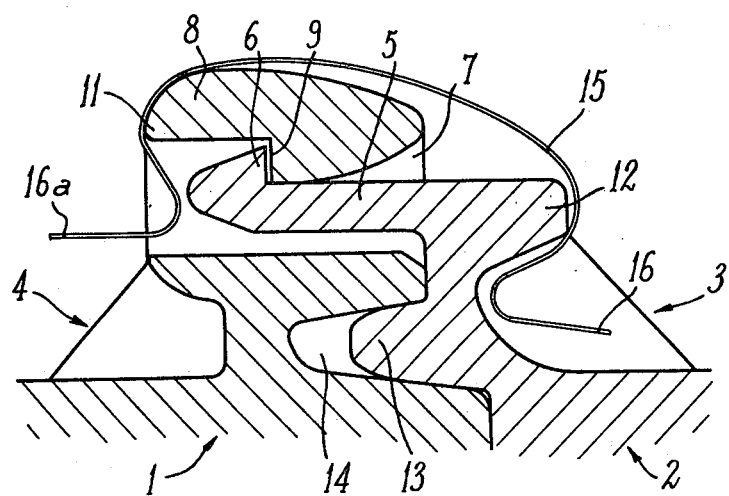
FIG. 3 is an elevation cross-sectional view similar to FIG. 2, the device being mounted in its original configuration.

FIG. 3 shows that the clip 15 can be provided ready for use during the initial assembly by capping the small bridge 8 and the nose 12.

Obviously, the invention is not limited to the embodiment shown and described in detail, and several modifications can be carried out without departing from its scope as shown in the appended claims.

I claim:

1. A device for mutual assembly of two parts which have to be occasionally disassembled, said two parts being produced from a synthetic material by moulding, wherein there is provided on the outer wall of each of said two parts at least one assembling group comprising a male portion on a first of said two parts and a female portion on a second of said two parts, the female portion defining a breakable upper member for freeing the male portion, said breakable upper member having a nose, the female portion further defining a recessed lower member, and the male portion having a nose and defining a recessed member, at least one resilient clip being provided to be provisionally engaged between the nose of said breakable upper member and the nose of the male portion; whereby after the breakable upper member of the female portion has been broken during a disassembly of the two parts, the resilient clip is engaged between the recessed member of the female portion and the recessed member of the male portion.

2. A device according to claim 1, wherein the male portion of each assembling group comprises a tongue having one end provided with a hook for cooperation with an edge formed by the breakable upper member, said breakable upper member closing top of a channel in which are engaged the tongue and the hook of the male portion.

3. A device according to claim 2, wherein the breakable upper member of the female portion is formed with at least one hole providing an access to the tongue and to the hook of the male portion.

4. A device according to claim 1, wherein the resilient clip is formed with an inclined engagement edge defining a ramp at one end.

5. A device according to claim 1, wherein the resilient clip is formed with two engagement edges.

6. A device according to claim 2, wherein the hook of the male portion has a height which is greater than a space left free below the breakable upper member of the female portion.

7. A device according to claim 1, wherein the resilient clip is put in place during initial assembly by capping the male and female portions.

8. A device according to claim 1, wherein the male and female portions are formed with centering bosses and cavities.

* * * * *